April 4, 1972
R. C. LINDWALL ET AL
3,654,107
PROCESS FOR CHLORINATION OF SATURATED HYDROCARBONS
Filed Jan. 18, 1968
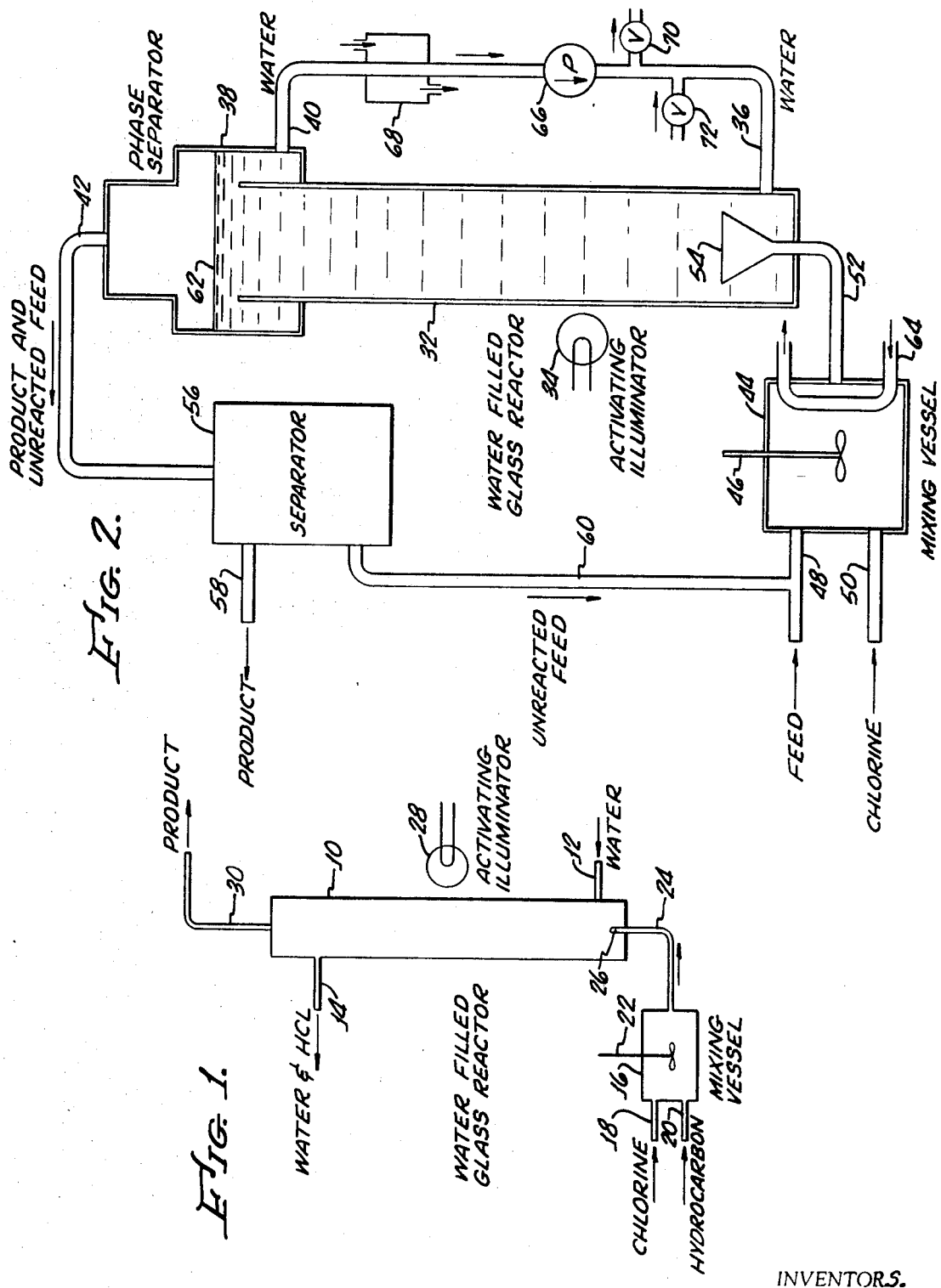
INVENTORS.
RICHARD C. LINDWALL
RICHARD E. CROCKER
BY
Donald W Canady
ATTORNEY.

United States Patent Office 3,654,107
Patented Apr. 4, 1972

---

3,654,107
PROCESS FOR CHLORINATION OF SATURATED HYDROCARBONS
Richard C. Lindwall and Richard E. Crocker, Anaheim, Calif., assignors to Atlantic Richfield Company, Philadelphia, Pa.
Filed Jan. 18, 1968, Ser. No. 703,838
Int. Cl. C07c *17/10*
U.S. Cl. 204—163 R   9 Claims

ABSTRACT OF THE DISCLOSURE

An apparatus and process for controlling the direct reaction of chlorine with a saturated hydrocarbon wherein the hydrocarbon and the chlorine are premixed in the dark under non-reacting conditions, the hydrocarbon-chlorine mixture is dispersed as globules or droplets in a flowing aqueous medium, and the aqueous medium carrying the suspended globules is exposed to reaction-initiating light, wherein the reaction temperature is controlled by the aqueous phase and inorganic reaction products are removed into the aqueous phase along with any water soluble inhibiting agents to permit complete reaction of the chlorine with the hydrocarbons are disclosed.

BACKGROUND OF THE INVENTION

Field of the invention

The present invention relates to alkyl chlorides, a process for producing alkyl chlorides, an apparatus for producing alkyl chlorides and to the production of detergent alkylates by reaction of the alkyl chloride with benzene or an alkylbenzene derivative.

Description of the prior art

Alkyl chlorides have achieved considerable commercial importance, particularly as solvents, secondary plasticizers, and as intermediates for the production of commercially valuable compounds. In recent years, large quantities of long chain alkyl chlorides have come into demand as an intermediate in the production of the so-called "soft" or biodegradable detergents. In this process, an alkyl chloride, usually containing between 10 and 15 carbon atoms, is reacted, as by a Friedel-Crafts, reaction, with benzene or an alkylbenzene derivative to produce what is commonly known as "detergent alkylate." The detergent alkylate is then sulfonated and neutralized to produce the end commercial product, the soft detergent.

As a result of the great commercial importance of alkyl chlorides as intermediates, many methods have been proposed for the production of such compounds on a commercial scale. On a laboratory scale, alkyl chlorides of relative high purity are most commonly produced by reacting an alcohol with a chlorine containing compound such as concentrated hydrochloric acid, phosphorous trichloride, etc. Alkyl chlorides may also be produced by reaction of an unsaturated hydrocarbon with hydrogen chloride.

The direct reaction of chlorine with a saturated hydrocarbon, by the free radical mechanism, in the presence of reaction initiating illumination has long been known and many processes involving this reaction have been proposed. Two major problems are encountered, however, when efforts are made to adapt reactions involving direct chlorination of hydrocarbons to a commercial scale. The first problem involves the difficulty of removing the heat of reaction and the second, and related, problem involves controlling the reaction so as to produce the desired products in economically feasible yields. It is well known, for example, that the direct reaction of chlorine with a saturated hydrocarbon produces a mixture of mono-, di-, tri-, etc., chlorinated compounds. In the synthesis of alkyl chlorides as a step in the production of detergent alkylate, it is, of course, highly desirable to produce a high yield of monochlorinated hydrocarbons. In other processes, it is highly desirable to produce polychlorinated hydrocarbons having a specific degree of chlorination, i.e. dichloro-, trichloro-, etc., hydrocarbons. It is, therefore, a much sought after process which will permit selective chlorination of hydrocarbons to the desired degree.

One can image a process for the direct reaction of chlorine with an alkane which would produce a 100 percent yield of monochloro-hydrocarbon. At least with the longer chain hydrocarbons, however, a 100 percent yield of the monochloro-product is not possible because there is an appreciable statistical possibility that even under ideal equilibrium conditions a second hydrogen on a high molecular weight hydrocarbon, one in which one hydrogen has been replaced with chlorine, will be attacked rather than a hydrogen on a non-chlorinated hydrocarbon molecule which is located remotely with respect to the attacking chlorine atom. It is desirable, however, to approach the maximum theoretical yield of the desired compound as closely as possible.

The direct injection of chlorine into a larger mass of hydrocarbon under reaction conditions and removal of the mixture of unreacted hydrocarbon and alkyl chloride has been proposed. This method for producing alkyl chlorides is not, however, well adapted to production of such compounds on a commercial scale. If chlorine is introduced into the body of hydrocarbon in sufficient quantities to make the reaction commercially attractive very serious problems of local overheating and uncontrolled reaction, in the vicinity where the chlorine first comes into contact with the hydrocarbons, are encountered. As a result, except when the chlorine is introduced at an extremely low rate, the composition of the reactants is virtually uncontrollable with large amounts of polychlorinated alkane being produced and while the gross heat of reaction may be removed, the actual heat of the mixture at the point of reaction cannot be controlled.

It has also been proposed to pass the chlorine and the hydrocarbon at very carefully metered rates through a reactor in parallel flow, the quantity of chlorine with respect to the hydrocarbon being very carefully limited, and to remove the heat by a cooling jacket on the outside of the reactor. The commercial applicability of such a process is limited not only by the difficulty in precise control of the rate of flow of the reactants but, more importantly, by the difficulty or impossibility of removing the heat of reaction from localized area at a sufficiently high rate to prevent local overheating.

It has also been proposed to wet the packing in a reaction column with water to such an extent that the heat of reaction evolved in the course of the chlorination can be immediately removed from the field of reaction by evaporation of the water. In this process, hydrocarbon, chlorine and water are introduced into the reaction column through pre-heaters to precisely control the temperature in exactly controlled amounts. In this process, more uniform and complete removal of the heat is possible but the necessary precise control limits the applicability of the process.

In addition, it has been proposed to supply the chlorine for the reaction as hypochlorous acid by reacting the chlorine with water prior to contacting the water with the hydrocarbon. Rather good control of the temperature of the reaction is apparently possible by this method but it is necessary that the reaction take place across a phase interface with the resulting relative low rate and inefficiency.

The present invention constitutes an improvement over the prior art in that the initial reactants are in intimate homogeneous mixture, the temperature of the reaction is completely controlled both on a mass heat removal basis and to prevent local overheating, and one of the reaction products is continuously being removed from the reaction zone so as to permit more complete reaction and to permit the reaction to attain equilibrium more rapidly.

SUMMARY OF THE INVENTION

The present invention may be summarized, without intending to limit the scope thereof, as a process and an apparatus for carrying out the process in which a saturated hydrocarbon is pre-mixed with chlorine in a darkened chamber. Conventionally, the chamber is made of conventional mild steel, carbon steel, or stainless steel. The hydrocarbon-chlorine mixture is then passed through a conduit to a globule forming nozzle which may form a series of individual globules or a multiplicity of globules simultaneously. The globule forming nozzle is in the lower portion of a usually vertical reaction chamber which has transparent walls. A static body of water which may include additionl components to accelerate or initiate the reaction is introduced into the reactor, or a stream of water may be fed in at the bottom of the reaction column, and the globules of the hydrocarbon-chlorine mixture are suspended in the body of water or the stream of upwardly flowing aqueous solution or water. As the aqueous solution carries the globules upwardly, the entire system (the aqueous solution and the globules) is exposed to light of sufficient intensity and appropriate wave length to initiate the chlorination reaction according to previously described principles. Because the organic phase is less dense, the globules will rise under the buoyancy of water or the rate at which the globules move through the reaction zone may be controlled by controlling the rate of flow of the aqueous solution in which the globules are suspended. Near the top of the reaction zone, an outlet is provided for constantly removing the water while the organic phase is removed separately further along the reaction vessel. If desired, a special phase separator may be provided at the end of the reaction vessel to permit the organic and aqueous phases to be separated more quickly and completely. If desired, also, a separator may be provided for the organic phase to recycle the unreacted hydrocarbon to the mixing chamber. For example, the entire organic output stream of the chlorinator could be dried and reacted with benzene with the unreacted alkane from this process being returned to the mixing chamber for recycling through the illuminated reaction zone. Obviously, several variations may be made without departing from the principle of the invention.

It is, accordingly, a principal object of this invention to provide a novel and improved method for carrying out halogenation reactions of hydrocarbons.

A more specific object of the invention is the provision of a novel means for controlling the temperature and reaction conditions during the chlorination of saturated hydrocarbons.

A still more specific object of the invention is the provision of a novel and improved process for providing alkyl chlorides for the production of detergent alkylate.

An important object of the invention is the provision of a process for producing alkyl chloride by reacting chlorine directly with saturated hydrocarbon in homogeneous mixture.

The provision of a novel apparatus for carrying out the subject process is a further object of the invention.

It is also an object of the invention to provide a process for synthesizing detergent alkylate.

Other objects of the invention will be apparent from the specification which follows and from the drawing which reference is now made.

BRIEF DESCRIPTION OF THE DRAWING

FIG. 1 illustrates schematically an apparatus for carrying out the process of this invention.

FIG. 2 illustrates a modified apparatus for carrying out the overall process of this invention, the apparatus being shown schematically.

DESCRIPTION OF THE PREFERRED EMBODIMENTS

Reference is made first to FIG. 1 wherein a simplified apparatus for carrying out the reaction is shown. A generally vertical elongated reaction chamber, which is preferably a glass tube 10, is provided with a water inlet 12 proximate the bottom thereof and a water outlet 14 just below the top thereof. The water inlet and outlet are provided for circulating water upwardly through the reaction chamber, which is preferably in the form of a water filled glass reactor, for purposes to be described. A mixing vessel 16 is provided with a chlorine inlet 18, a hydrocarbon inlet 20 and a mixing device 22. The mixing device may be in the form of a propeller or impeller inside the vessel with a shaft extending through the wall thereof for mixing the chlorine and the hydrocarbon, a pump for recirculating the chlorine and hydrocarbon, or any other means for providing a uniform mixture of these reactants. An outlet conduit 24 carries the mixture to a globule forming means 26 which, in the subject embodiment, is designed to form a series of individual discrete globules which are suspended by the water and pass upwardly through the reaction chamber carried by the water. As the water and the globules of suspended reactant mixture pass upwardly through the reaction zone they are illuminated by a light 28 to initiate the chemical reaction between the chlorine and the hydrocarbon. The organic phase, normally being less dense, collects at the top of the reaction vessel and is removed through the outlet conduit 30.

In the embodiment shown in FIG. 2, the reaction vessel 32 which may be a water filled glass reactor or a vessel having at least a portion of the walls made of transparent material for permitting illumination of the interior of the reaction vessel by a light 34, is provided with a water inlet 36, a phase separator 38 for separating the organic phase from the water phase and a water outlet 40. As in the embodiment of FIG. 1, the water outlet removes the water and the hydrochloric acid formed as a result of the reaction. The organic reactants are removed by a conduit 42. The organic reactants for the process are supplied from a mixing vessel 44 which has a feed-input 48 and a chlorine input 50 and a mixer 46, as previously described, by means of a conduit 52 and a dispersing nozzle 54 of a conventional type for producing a multiplicity of individual discrete globules of organic reactant for being suspended in the water which flows in the water input 36 rather than simply a series of globules as in FIG. 1. The globules pass through the reaction zone and to the phase separator where the organic phase is removed through the outlet conduit 42. The organic phase may then be fed to a separator 56 and the desired product removed through outlet 58 with the unreacted feed, normally saturated hydrocarbon, being returned to the feed inlet 48 by means of conduit 60. The approximate level of the organic phase is shown generally at 62 in the phase separator of the reaction vessel.

The separator 56 may be a conventional distillation unit, a selective adsorption unit, or it may include means for drying the organic output of the reaction vessel and reacting the alkyl chlorides contained therein with benzene over a Friedel-Crafts catalyst. Selective removal of the alkylate would separate the unreacted saturated hydrocarbons from the chlorinated product. The unreacted hydrocarbon would then be returned to the feed inlet 48 for being recycled through the process. Thus a complete process for producing detergent alkylate is provided.

Since the hydrocarbon and the chlorine are intimately mixed in the premixing vessel under non-reacting conditions, no heat removal mechanism is generally required for the premixing vessel. However, even in the dark there may be some reaction of the chlorine with a hydrocarbon, particularly at higher temperatures, and it may be desirable to provide a heat exchanger or heat removal means shown generally at 64 in the mixing vessel 44. The heat removal means may simply be a cooling coil.

In a preferred embodiment of the process distilled or otherwise purified water may be used as the suspending coolant. As the process proceeds, the aqueous phase extracts the HCl produced by the reaction of chlorine with the alkane from the organic phase thus forming a solution of hydrochloric acid. Because of the high solubility of hydrogen chloride in water comparatively concentrated solutions of hydrochloric acid may be produced without substantially detrimentally affecting the efficiency of the chlorination reaction. By careful selection of reactants and reactor materials, muriatic acid of rather high purity is a byproduct of the chlorination reaction. The muriatic acid thus produced may be drawn off in a batchwise process simply by draining the reactor. If this is done, it may be desirable to provide a supplementary cooling means in the reaction zone, such as a heat exchanging coil in the tube for maintaining the temperature of the aqueous phase at a desired level.

In a preferred embodiment, however, the water is recirculated by means of a pump 66 through a heat exchanger 68 for controlling the temperature of the aqueous phase. Obviously, the heat exchanger may be used to cool the aqueous phase or, if it is desired to maintain the reaction at an elevated temperature, to heat the aqueous phase. Generally, the heat of reaction is removed in the heat exchanger 68. In this way, the water is recirculated until a desired concentration of muriatic acid is produced. At this stage, a small quantity of the muriatic acid may be drawn off through an outlet and valve shown at 70 and water may be added through the inlet and valve shown at 72 to maintain the aqueous fluid level in the reactor. Thus, the reaction process and the apparatus described constitute a method and apparatus for producing muriatic acid of comparatively high purity as well as the more valuable chlorinated hydrocarbon. The muriatic acid may, of course, be treated subsequently to upgrade its concentration and/or quality. For example, the HCl may be adsorbed according to known processes and in known apparatus. The industrial value of muriatic acid is, of course, well known.

For reasons discussed herein, the examples of the reaction illustrate the chlorination of a comparatively long chain alkane, n-dodecane, for comparison purposes and because of the high commercial value of the product. There are, however, rather substantial advantages in carrying out the present process with lower molecular weight alkanes which are normally gaseous at room temperature and pressure, such as butane, propane, etc. As is described hereinafter, the process may be carried out under pressure. In so carrying out the process these normally gaseous alkanes are in the liquid phase and the process may be carried out in the same manner and using substantially the same type of equipment, constructed of materials to withstand the pressure required, as is utilized for the chlorination of n-dodecane. Indeed, the equipment used for maintaining pressure in the reactor column for the chlorination of n-dodecane may be used with these alkanes. It is well known that light-initiated chlorination in the gas phase is virtually uncontrollable and may even be hazardous. The present process permits total control of the process at all stages of chlorination. Thus, the present process provides substantial operating advantages and utility as compared with the prior art.

It will be understood that throughout the foregoing description, examples of the various elements are given but equivalently constructed elements may be used.

Various inhibitors may be added to the system to prevent reaction of the chlorine in the premixing vessel or prior to the exposure of the mixture to the reaction-initiating illumination. Such inhibitors may include iodine, ferric chloride, phosphorus trichloride, antimony trichloride, bismuth trichloride, etc. It is desirable that the inhibitor be water-soluble such that it will be extracted into the aqueous phase when the organic phase is distributed as globules for being suspended in the aqueous phase.

Some inhibitors are effective to prevent reaction of the chlorine with the hydrocarbon while the mixture is in the dark but do not prevent reaction once the mixture is exposed to reaction-initiating illumination.

In addition, an inhibitor, such as $FeCl_3$ which forms an inactive hydrate, which may be deactivated by reaction with a component of the aqueous phase, in addition to being extracted, or by a subsequently added reactant may be utilized.

It has been discovered that, by means of the inventive process, the stream of water acts advantageously to separate the suspended globules and to keep the globules separate from one another for a period long enough to permit the reaction to take place in individual reaction zones, to remove heat at the very point of reaction to prevent localized overheating, to extract certain inhibitors as the reaction proceeds to permit the reaction to proceed more smoothly, and to extract hydrogen chloride liberated during the reaction thus removing one of the products from the zone of reaction to permit the reaction to proceed more smoothly and quickly to completion.

As will be pointed out more fully hereinafter, the inventive process and apparatus permits the continuous chlorination of the desired hydrocarbon or hydrocarbon mixture with all the advantages of a continuous process, such as ease of control, higher production rates, etc., along with substantially all of the advantages of a batch reaction process.

In a preferred embodiment of the process, it is desirable to maintain the column under elevated pressure in order to prevent chlorine from separating from the hydrocarbon into the aqueous phase. This additional process step, further aids in establishing a desirable equilibrium condition.

The inventive process avoids the difficult problem of back-mixing which occurs when chlorine is added directly to the hydrocarbon under reaction conditions.

An addtional advantage of the present process has also been discovered in that some materials, such as ferric chloride, act to catalyze ionic chlorination of the hydrocarbon but inhibit free radical chlorination such as occurs in a photochemical reaction. Conversely, certain other material such as iodine act as inhibitors for the ionic chlorination reaction but as initiators for the free radical or photochemical reaction. It may be desirable to utilize one or both of these concepts to control the present process. For example, iodine may be added to the hydrocarbon-chlorine mixture to act as an inhibitor while the mixture is maintained in the dark and to act as an initiator once the mixture is exposed to the reaction-initiating illumination. Ferric chloride could also be added to the hydrocarbon-chlorine mixture. In this latter case little extraction of iodine would occur into the aqueous phase while substantially all of the ferric chloride would be extracted into the aqueous phase. By proper selection of the proportions of these mtaerials, the reaction rate may be very carefully controlled.

It may be desirable to use the water phase as a source of initiating chemical as well. For example, the water may include potassium iodide which upon exposure to ultraviolet radiation of sufficient intensity will be converted to iodine. The iodine will tend partially to dissolve in the organic phase and, particularly, in the peripheral layers of each globule such that the reaction is initiated in the globule in the area immediately adjacent the aqueous phase to permit instantaneous removal of the heat of reaction and to prevent any possible overheating locally. This is particularly important where a long reaction zone is contemplated. This permits the reaction to be initiated in the peripheral area of each of the small globules and as the iodine dissolves further into the globules the reaction will be initiated smoothly toward the interior of each globule to permit the smooth and uniform removal of heat from each of the small gloubes of the organic phase.

For the reasons previously described, and because equilibrium data were conveniently available from prior studies on the chosen system, examples of chlorination of dodecane utilizing the inventive process will be given but it will be understood that these examples are intended merely to illustrate the invention and are not intended as limiting. Obviously, a skilled chemist would be able to adapt the specific examples to other hydrocarbons of the family of interest without any substantial experimentation.

EXAMPLE I 8.2 grams of chlorine were dissolved in 14.5 grams of n-dodecane at 60 p.s.i.g. The dissolution was carried out in a light-excluding carbon-steel vessel at ambient temperature. After approximately 10 minutes, the resulting yellow mixture was added to a glass pressure vessel and exposed to visible and ultraviolet light. The aqueous phase became green owing to the dissolved ferric chloride and the hydrocarbon phase turned colorless. The ferric chloride was present, presumably, because of the reaction of chlorine with the walls of the steel vessel. There was considerable heat of reaction, but in spite of this, the pressure in the vessel decreased due to the disappearance of chlorine.

Gas chromatographic analysis of the product gave the following composition percentages: unconverted alkane—34.4 percent; monochlorododecane—36.6 percent; and polychlorododecane—29.0 percent. These figures are identical to the theoretical molar yields predicted for 65.6 percent conversion of the alkane to alkyl chloride in a batch process under idealized conditions of homogeneity. Thus 100 percent of the theoretically available monochlorododecane was obtained.

EXAMPLE II

Dodecane was saturated with chlorine at 30 p.s.i.g. and the mixture was passed into a 3 inch long, ½ inch inside diameter, water-filled glass column illuminated by fluorescent lamps and a 140-watt ultraviolet lamp. 35.8 percent of the dodecane was converted. Of this, 79.6 percent of the product was monochlorododecane. The theoretical yield of a batch reaction under idealized conditions is 79.3 percent, indicating that, within the experimental limits of the determination, 100 percent of the theoretically available monochlorododecane was obtained.

EXAMPLE III

Dodecane was saturated with chlorine at cylinder pressure and the mixture was passed into a 5 inch long, ½ inch inside diameter, water-filled glass column of the type described in the form of the globules described. 60.7 percent of the dodecane was converted. Of the converted dodecane, 59.8 percent was found to be monochlorododecane. The theoretical yield for monochlorododecane for a dodecane conversion of 61.7 percent is 60.3 percent, indicating that approximately 99 percent of the theoretically available monochlorododecane was obtained.

For comparison purposes, the following example is given:

EXAMPLE IV

Dodecane was premixed with chlorine in the same premixing chamber as was used in Example I under the same circumstances, i.e., the chamber was rocked with an automobile vacuum window wiper motor fitted with laboratory clamps during saturation with chlorine. The hydrocarbon-chlorine mixture was then allowed to flow under gravity into the evacuated glass reaction tube. There was an immediately rapid reaction. The product of this reaction was a dark brown colored liquid, in contrast to the water white liquid obtained in, e.g. Example I.

A detailed analysis of the dark reaction product of Example IV is not available but it is apparent from the deeply colored product that rather complex reaction products resulted with the attendant lowering in yield of the monochlorododecane product.

During some of the experiments, the hydrocarbon-chlorine globules were caused to pass through the reaction zone at a variety of rates. It was noted that as the bubbles ascended in the reaction column there was a decrease in the size of the individual bubbles, suggesting the utilization of the chlorine and the possible extraction of chlorine from the hydrocarbon into the water phase. To overcome this problem, the reaction vessel was pressurized at 70 p.s.i.g. with nitrogen. The results of one such experiment are given in Example III.

During these experiments, two mixing chambers were used. One was a carbon-steel tube consisting of an 8 inch long section of one-half inch carbon-steel pipe with nipple couplings of the same material on each end. The other was a 300 cc. stainless steel Hoke pressure bomb. In two experiments, it was noted that during the mixing operation some heat was generated. In the second of these, the mixture was passed into aqueous potassium iodide and the organic phase was treated with sodium thiosulfate and water. Gas chromatographic analysis indicated that only very small amounts of the chlorine had been converted. In two experiments using the stainless steel bomb, there was considerable heat generated but no attempt at analysis was made. Reaction inhibitors of the type mentioned or cooling inside the reaction vessel solve the premixing reaction problems noted above.

Because of the convenience in utilizing iron or iron alloy mixing vessels and other equipment, the effect of iron on the chlorination reaction discussed herein was studied. Several batch runs were made wherein the reaction was carried out in a light-free reactor assembly made from carbon steel pipefittings. At temperatures below 57° C., there was little or no reaction. In the temperature range 85 to 102° C. the reaction was rapid but the products from these higher temperature runs were a dark brown indicating the presence of high molecular weight polymerization products and carbon residue. Gas chromatographic analysis of the product of the reaction of chlorine with dodecane at 102° C. showed that only 67 percent of the theoretically available monochlorododecane was produced and that the polychlorododecane content was three times that produced in the preferred embodiment of the process.

In another experiment iron turnings were introduced into a glass reactor and the chlorination was carried out in a batch reaction. The reaction mixture was exposed to natural light existing in the laboratory. At room temperature there was no reaction but when the reaction mixture was heated to 100° C. it turned green. Filtration of the product left a carbon residue on the filter and the yellow filtrate retained its color on extraction with water indicating the presence of high molecular weight polymers. A similar reaction wherein the reaction mixture was irradiated with an ultraviolet lamp gave similar results except that at lower temperatures, 50° C., and low conversion there was somewhat less product degradation.

These experiments substantiate earlier indications that iron exhibits an adverse effect on the chlorination reaction. Where the reaction is carried out in a glass reactor and the temperature is controlled according to the present process, the product was a water white liquid which included substantially the theoretically available monochloro product, as previously indicated. It should be noted that by controlling the temperature in the mixing vessel an iron or iron alloy vessel may be used safely. Similarly, other portions of the handling system may be made of iron so long as iron is not present in the reaction zone. As indicated, iron is removed from the organic mixture by extraction into the aqueous phase and is inactivated by the formation of a hydrate.

Exemplary devices, such as a ¼ inch stainless steel heavy wall tubing, a 1/16 inch stainless steel capillary tubing, with and without the ends pinched, and a ¼ inch Pyrex capillary tubing drawn to a tip were used to form globules. Globule size was proportional to the orifice size. In the particular apparatus utilized, the glass capillary gave the best results. At low flow rates, very uniform and well-spaced globules were obtained. At higher flow rates, smaller globules with an occasional large globule resulted. These large globules are undesirable for the reasons previously discussed.

Two 40 watt fluorescent tubes were arranged in parallel to illuminate the column and a 140 watt input ultraviolet lamp was used in addition. It was found that the fluorescent lamps, alone, were not adequate to produce total conversion of chlorine. An equivalent and probably superior method of illumination would be to place a plurality of tubular illuminating devices at spaced positions inside the reaction vessel.

The water utilized during these experiments was deionized in some cases and tap water in other cases. In all cases the water was at ambient temperature and no difference observed could be attributed to the use of deionized water instead of ordinary tap water.

In all cases, utilizing the globule forming method described, the reaction proceeded smoothly and was easily controlled.

It will be apparent from the foregoing description and from the specific examples given that a novel process has been described which is highly advantageous in several respects. In particular, backmixing problems generally and particularly local overheating with adverse side reactions are avoided. Theoretical yields of the monochloro product are obtained. The reaction is easily controlled and can be scaled to any desired commercial size.

It will be apparent to anyone having ordinary skill in the art that while the examples given illustrate the comparative results using dodecane as the exemplary hydrocarbon other hydrocarbons may be utilized. The lighter gaseous hydrocarbons may more easily be mixed with the chlorine while more energetic mixing means may be necessary where very heavy hydrocarbons are involved. Except for the apparatus required for physically manipulating the respective hydrocarbons, however, the steps of the process and the apparatus would be identical. Such apparatus and steps for manipulating hydrocarbons of various molecular weights are, of course, well known to anyone having rudimentary skill in these arts. Other variations of the process may be made without departing from the spirit of the invention and from the scope of the invention as defined in the following claims.

We claim:

1. In a process for producing chlorinated hydrocarbons having a high degree of monochlorination by the direct reaction of a saturated acyclic hydrocarbon or a partially halogenated saturated acyclic hydrocarbon, said hydrocarbon to be liquid at reaction conditions, with chlorine activated by exposure of the reactants to illumination including ultraviolet light, the improvement wherein; the reactants are mixed together in the dark and the resulting mixture is dispersed to form discreate globules in a substantially immiscible aqueous phase, said aqueous phase and globules being exposed to reaction initiating illumination for a time sufficient to achieve a high degree of monochlorination and at a temperature and pressure sufficient to maintain the reactants in liquid phase.

2. The process of claim 1 further comprising the step of: impelling the aqueous phase through an illuminated reaction zone for carrying the globules suspended in the aqueous phase through the reaction zone at a predetermined rate.

3. The process of claim 1 further comprising the step of: circulating the aqueous phase in which the globules are suspended through an illuminated reaction zone by the addition of fresh aqueous solution and the removal of aqueous solution which contains reaction products.

4. In a process for reacting chlorine with a saturated acyclic hydrocarbon or partially halogenated saturated acyclic hydrocarbon, said hydrocarbon to be liquid at reaction conditions, under conditions of reaction-initiating illumination including ultraviolet light wherein the reactants are premixed under non-reacting conditions and the mixture is exposed to reaction-initiating conditions, the improved method of controlling the reaction conditions comprising the steps of: dispersing the reaction mixture to form relatively small discrete droplets; suspending said droplets in an aqueous body for extracting at least one reactant product from said droplets into said aqueous body; and exposing said aqueous phase and suspended droplets to reaction-initiating illumination including ultraviolet light for a time sufficient to achieve a high degree of monochlorination and at a temperature and pressure sufficient to maintain the reactants in liquid phase.

5. In the process of claim 4 the improvement further comprising the step of: adding aqueous phase on one side of the reaction zone and removing aqueous phase on the other side of the reaction zone for removing reaction products from the system.

6. The process of claim 4 wherein the hydrocarbon is an alkane having between 10 and 18 carbon atoms per molecule.

7. The process of claim 5 further comprising the step of: pressurizing the reaction zone to above atmospheric pressure.

8. A process for making detergent alkylate which comprises the steps of:

mixing at least one alkaine, said alkane being liquid at reaction conditions, with chlorine in predetermined relative proportions under substantially non-reacting conditions;

suspending droplets of said mixture of alkane and chlorine in an aqueous phase;

exposing the aqueous phase and the droplets of the mixture suspended therein to reaction-initiating illumination including ultraviolet light for a time sufficient to achieve a high degree of monochlorination and at a temperature and pressure sufficient to maintain the reactants in liquid phase;

separating the organic phase, including alkyl chloride formed in the droplets, from the aqueous phase which includes water soluble reaction products; and reacting the alkyl chloride with a hydrogen containing monocyclic aromatic compound to form detergent alkylate.

9. The process of claim 8 further comprising the steps of:

separating unreacted alkane from the alkyl chloride and derivatives of alkyl chloride; and recycling the alkane thus separated in the process of claim 8.

References Cited

UNITED STATES PATENTS

| 2,370,342 | 2/1945 | Zellner | 204—163 |
| 2,948,667 | 8/1960 | Limido et al. | 204—163 |
| 3,437,573 | 4/1969 | Hurley et al. | 204—163 |
| 3,506,552 | 4/1970 | Russell | 204—163 |
| 3,506,553 | 4/1970 | Mottern et al. | 204—163 |
| 3,507,762 | 4/1970 | Holiday | 204—163 |

CARL D. QUARFORTH, Primary Examiner

P. A. NELSON, Assistant Examiner

U.S. Cl. X.R.

204—162 R